United States Patent
Gupta et al.

(10) Patent No.: US 10,853,982 B2
(45) Date of Patent: Dec. 1, 2020

(54) SYSTEMS AND METHODS FOR SELECTING IMAGES FOR PLACEMENT IN PORTIONS OF A GRAPHICAL LAYOUT

(71) Applicant: Rovi Guides, Inc., San Jose, CA (US)

(72) Inventors: Ankit Gupta, Delhi (IN); Vishwas Sharadanagar Panchaksharaiah, Tumkur District (IN); Vikram Makam Gupta, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/366,562

(22) Filed: Mar. 27, 2019

(65) Prior Publication Data
US 2020/0311994 A1   Oct. 1, 2020

(51) Int. Cl.
| | |
|---|---|
| *G06T 11/60* | (2006.01) |
| *G06T 7/00* | (2017.01) |
| *G06F 16/54* | (2019.01) |
| *G06F 9/451* | (2018.01) |

(52) U.S. Cl.
CPC ........... *G06T 11/60* (2013.01); *G06F 9/451* (2018.02); *G06F 16/54* (2019.01); *G06T 7/0002* (2013.01); *G06T 2207/30168* (2013.01)

(58) Field of Classification Search
CPC ............ G06T 11/60; G06T 7/0002; G06T 2207/30168; G06F 16/54; G06F 9/451
See application file for complete search history.

(56) References Cited

U.S. PATENT DOCUMENTS

| 7,770,109 B2* | 8/2010 | Fortes | G06Q 30/02 |
| | | | 715/246 |
| 9,507,506 B2 | 11/2016 | Grosz et al. | |
| 9,552,374 B2 | 1/2017 | Ptucha et al. | |
| 2005/0134900 A1* | 6/2005 | Kuwata | H04N 1/3871 |
| | | | 358/1.15 |
| 2008/0309777 A1 | 12/2008 | Aoyama | |
| 2009/0252435 A1 | 10/2009 | Wen et al. | |
| 2010/0083317 A1 | 4/2010 | Inagaki et al. | |
| 2011/0052056 A1 | 3/2011 | Kigure | |
| 2011/0077877 A1* | 3/2011 | Nikaido | G01R 31/307 |
| | | | 702/58 |

(Continued)

OTHER PUBLICATIONS

U.S. Appl. No. 16/366,549, filed Mar. 27, 2019, Ankit Gupta.
U.S. Appl. No. 16/366,552, filed Mar. 27, 2019, Ankit Gupta.

*Primary Examiner* — Robert J Craddock
(74) *Attorney, Agent, or Firm* — Haley Guiliano LLP

(57) ABSTRACT

Systems and methods are described herein for selection of tagged images to populate the graphical layout. The system accesses a layout that defines a plurality of portions of the graphical layout and corresponding image parameters for each portion of the graphical layout. The system selects a first portion of the plurality of portions and retrieves the corresponding image parameters. If the image parameters indicate that the selected portion of the graphical layout is subject to a visual effect, the system selects an image having image parameters, such as the tags described above, indicating that the image can be placed in a portion of the graphical interface which will be subject to the particular visual effect. Otherwise, the system selects an image having image parameters that match the image parameters corresponding to the selected portion of the graphical interface.

9 Claims, 10 Drawing Sheets

(56) References Cited

U.S. PATENT DOCUMENTS

| | | | |
|---|---|---|---|
| 2012/0124474 A1* | 5/2012 | Suh | H04N 5/44591 715/717 |
| 2012/0222058 A1 | 8/2012 | el Kaliouby et al. | |
| 2017/0331952 A1 | 11/2017 | Rogers et al. | |
| 2019/0026929 A1 | 1/2019 | Kikin-Gil et al. | |

* cited by examiner

SYSTEMS AND METHODS FOR SELECTING IMAGES FOR PLACEMENT IN PORTIONS OF A GRAPHICAL LAYOUT

BACKGROUND

The present disclosure relates to graphical user interfaces and, more particularly, placement of images in portions of a graphical user interface which is subject to a visual effect.

SUMMARY

Applications of today aim to show comprehensive information in a graphical interface that fits on a single screen. As a result, the layout of the graphical interface is often divided into several portions, with each portion dedicated to showing one type of information. The user can interact with each portion of the screen, such as by scrolling or touch input. Additionally, each portion can be subject to visual effects such as blurring, dimming, and size enlargement and/or reduction to fit the screen. The images placed in each portion of the graphical layout may not be ideal for use with such visual effects.

Systems and methods are described herein for tagging images for placement in a graphical layout and for selecting tagged images to populate the graphical layout. The overall brightness of an image is determined and, if the overall brightness is below a threshold level of brightness, the image is tagged with a negative identifier, indicating that the image cannot be placed in a portion of the graphical layout that will be dimmed. If the overall brightness exceeds the threshold level of brightness, then the image is tagged with a positive identifier, indicating that the image can be placed in a portion of the graphical layout that will be dimmed.

If the overall brightness is above the threshold level of brightness, the image may be partitioned into a plurality of sectors, and the average brightness of each sector compared with the average brightness of each adjacent sector to determine if there is sufficient contrast to maintain definition between various parts of the image when the image is dimmed. If there is sufficient difference between the brightness of each sector, then the image is tagged with the positive identifier. If, however, the difference between the brightness of any two adjacent sectors is insufficient, then the image is tagged with the negative identifier.

The resolution of the image may be used to determine whether the image can be placed in a portion of the graphical layout that will be blurred. The system determines whether any portion of the image is affected by the overall resolution of the image. If so, then the image is tagged with a negative identifier, indicating that the image cannot be placed in a portion of the graphical layout that will be blurred. If the overall resolution does not affect the image, the system determines whether any portion of the image would be affected by blurring the image. If so, then the image is tagged with the negative identifier. If not, then the image is tagged with a positive identifier, indicating that the image can be placed in a portion of the graphical layout that will be blurred.

The system may perform similar analyses based on the effects of dimming or blurring on faces depicted in the image. The system identifies faces depicted in the image and determines the relative brightness of each face. If the relative brightness of any face is below a threshold level of brightness, then the image is tagged with a negative identifier, indicating that the image cannot be placed in a portion of the graphical layout that will be dimmed. If the relative brightness of every face exceeds the threshold level of brightness, then the image is tagged with a positive identifier, indicating that the image can be placed in a portion of the graphical layout that will be dimmed.

The system may determine whether the overall resolution of the image affects any of the faces depicted in the image. If the overall resolution affects any face, then the image is tagged with the negative identifier. If the overall resolution does not affect any face, then the system determines whether any face would be affected by blurring based on the size of each face. If blurring will affect any face, then the image is tagged with the negative identifier. If no face will be affected by blurring, then the image is tagged with a positive identifier indicating that the image can be placed in a portion of the graphical layout that will be blurred.

When populating the graphical layout with images, the system selects an image for placement in a portion of the graphical layout. The system accesses a layout that defines a plurality of portions of the graphical layout and corresponding image parameters for each portion of the graphical layout. The system selects a first portion of the plurality of portions and retrieves the corresponding image parameters. If the image parameters indicate that the selected portion of the graphical layout is subject to a visual effect, the system selects an image having image parameters, such as the tags described above, indicating that the image can be placed in a portion of the graphical interface that will be subject to the particular visual effect. Otherwise, the system selects an image having image parameters that match the image parameters corresponding to the selected portion of the graphical interface.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
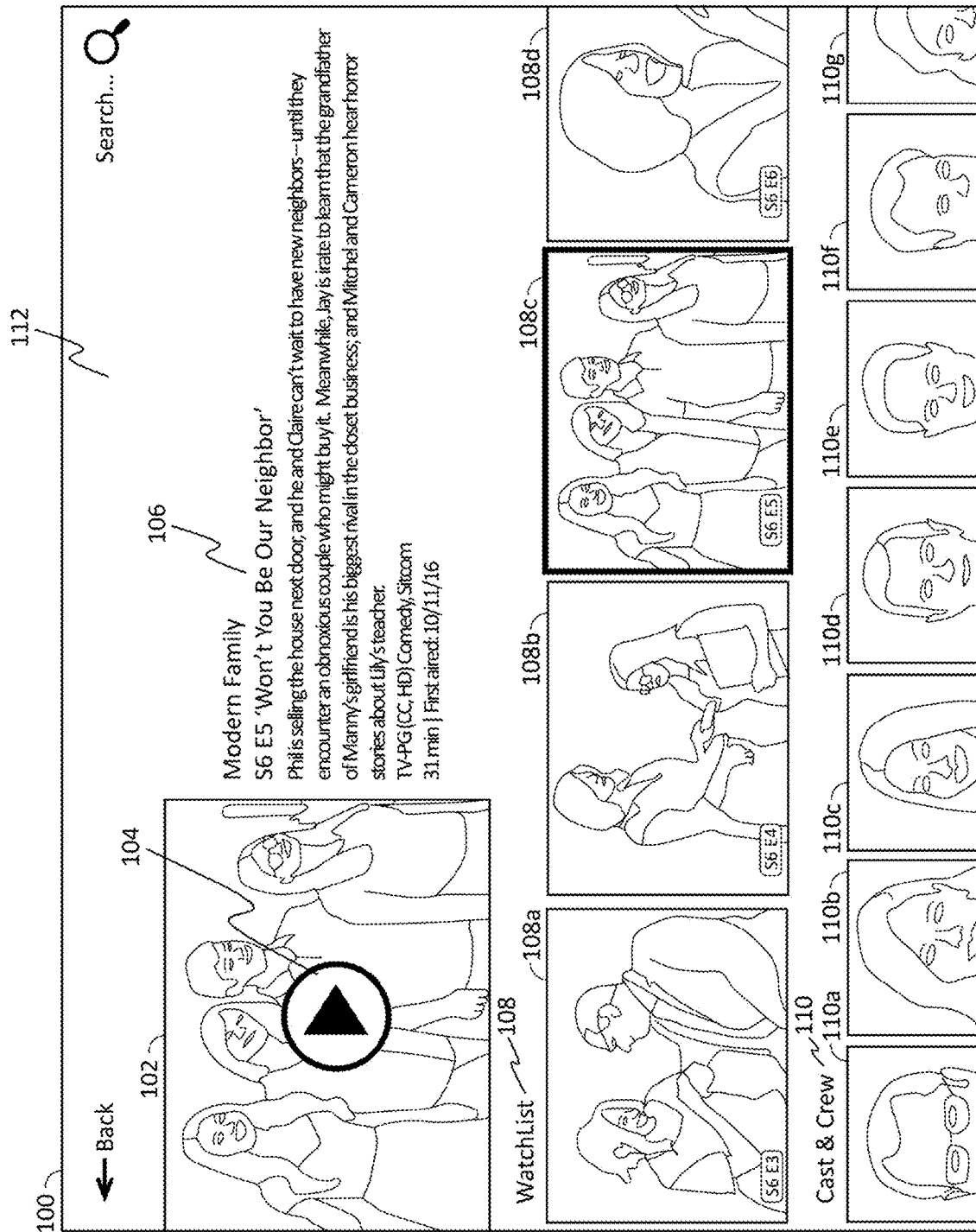
FIG. 1 shows an exemplary graphical layout in which images are to be placed, in accordance with some embodiments of the disclosure.

FIG. 1 shows an exemplary embodiment of a graphical layout 100 in which images are to be placed, in accordance with some embodiments of the disclosure. Graphical layout 100 includes a large thumbnail image 102 of a particular episode of the television series "Modern Family." A play button 104 is overlaid on the thumbnail image 102, which the user may select to begin watching the episode. Text 106 is placed next to thumbnail image 102 and includes the title of the series, the title of the episode, and a description of the episode plot, along with other information related to the episode such as rating, runtime, and air date. Below thumbnail image 102 is a scrollable area 108 entitled "WatchList," which contains a number of smaller thumbnails 108a-108d of a number of episodes of the series. The border of thumbnail 108c is highlighted, indicating that it is the currently selected episode to which thumbnail image 102 and text 106 correspond. Below WatchList 108 is another scrollable area 110 entitled "Cast & Crew," which contains images 110a-110g of each member of the cast and crew of the series. All of these graphical elements are placed over background area 112, which may also contain an image generally relating to the series, such as a cast photo, publicity photo, show logo, or other image. An image (not pictured) placed in background area 112 is dimmed or blurred to avoid confusion with the other graphical elements with which the user can interact. Additionally, any of graphical elements 102, 106, 108, and 110 may also be subject to visual effects. As used herein, the term "visual effects" or "image effects" refers to any image manipulation that alters how an image is displayed to the user. While the methods described in this disclosure can be used with any suitable visual effect, this disclosure will discuss only dimming and blurring effects. As described below, images are selected for placement in each portion of the graphical layout only if they are suitable for use with relevant visual effects for each particular portion.

Figure 2:
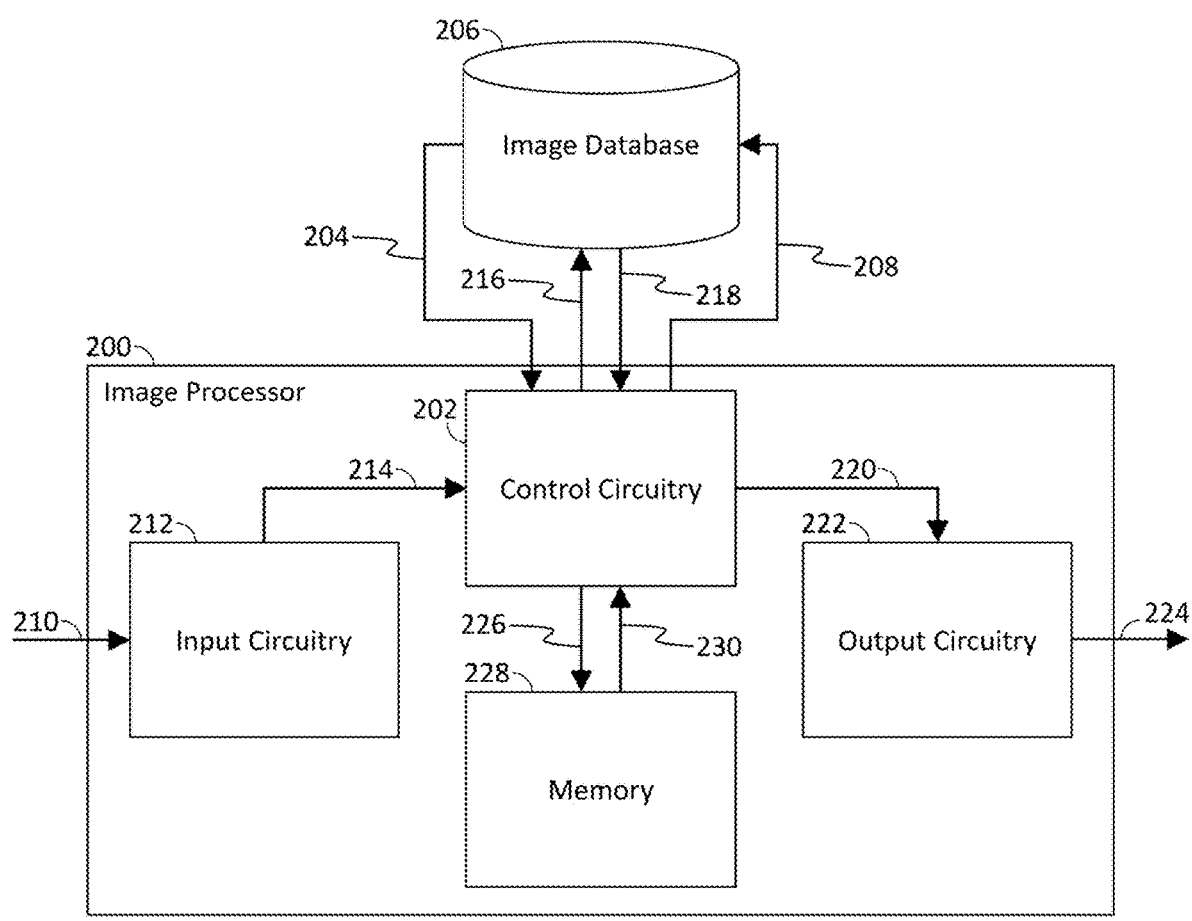
FIG. 2 is a block diagram representing control circuitry and data flow within an image processor, in accordance with some embodiments of the disclosure.

FIG. 2. is a block diagram representing control circuitry and data flow within an image processor 200, in accordance with some embodiments of the disclosure. Image processor 200 is configured to identify characteristics of an image and determine whether the image can be subject to any visual effects. Image processor 200 receives, at control circuitry 202, image 204 from image database 206, which may be stored locally on the same device on which image processor 200 is employed, or may be stored on a remote server. Control circuitry 202 may be based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Control circuitry 202 processes image 204 to determine image parameters of image 204, such as overall brightness and overall resolution. Control circuitry 202 compares the overall brightness of the image to a threshold level of brightness. If the overall brightness of image 204 is below the threshold level of brightness, control circuitry 202 determines that image 204 cannot be placed in a portion of the graphical layout that will be dimmed and tags image 204 with a negative identifier, indicating that the image cannot be dimmed. If the overall brightness of image 204 meets or exceeds the threshold level of brightness, control circuitry 202 determines that image 204 can be placed in a portion of the graphical layout that will be dimmed, and tags image 204 with a positive identifier, indicating that image 204 can be dimmed. Alternatively, if the overall brightness of image 204 meets or exceeds the threshold level of brightness, control circuitry 202 partitions image 204 into a plurality of sectors. Control circuitry 202 determines the average brightness of each sector and identifies a subset of sectors having an average brightness that is below the threshold level of brightness. Control circuitry 202 determines whether there is sufficient contrast between each sector of the subset of sectors and its adjacent sectors by comparing the average brightness of each sector of the subset of sectors with the average brightness of each adjacent sector. If the difference in brightness is below a second threshold, indicating that there is insufficient contrast between the sectors, control circuitry 202 determines that image 204 cannot be placed in a portion of the graphical layout that will be dimmed and tags image 204 with a negative identifier, indicating that image 204 cannot be dimmed. If the difference in brightness meets or exceeds the second threshold, control circuitry 202 determines that image 204 can be placed in a portion of the graphical layout that will be dimmed and tags image 204 with a positive identifier, indicating that image 204 can be dimmed.

Control circuitry 202 determines whether the overall resolution of image 204 affects any portion of the image. For example, control circuitry 202 may use edge detection to identify edges of objects depicted in image 204 and analyze color and brightness data for pixels adjacent to each detected edge. Control circuitry may determine from the color and brightness data whether the edge is currently blurred, indicating that the resolution of the image currently affects at least one portion of image 204. If the overall resolution affects any portion of image 204, control circuitry 202 determines that image 204 cannot be placed in a portion of the graphical layout that will be blurred and tags image 204 with a negative identifier, indicating that image 204 cannot be blurred. If the overall resolution does not currently affect any portion of image 204, control circuitry 202 determines whether blurring will affect image 204. For example, control circuitry 202 determines the smallest distance between two opposing edges of each object and compares that distance with a threshold distance. If the smallest distance between two opposing edges of any object is below the threshold distance, control circuitry 202 determines that blurring will affect image 204 and that image 204 cannot be placed in a portion of the graphical layout that will be blurred. Control circuitry 202 tags image 204 with a negative identifier, indicating that image 204 cannot be blurred. If the smallest distance between two opposing edges of every object meets or exceeds the threshold distance, control circuitry 202 determines that blurring will not affect image 204 and that image 204 can be placed in a portion of the graphical layout that will be blurred. Control circuitry 202 tags image 204 with a positive identifier, indicating that image 204 can be blurred.

In determining whether image 204 can be dimmed or blurred, control circuitry 202 may also analyze the brightness and size of faces depicted in image 204. Control circuitry 202 uses facial recognition to identify faces depicted in image 204 and, similar to the brightness analysis described above, control circuitry 202 determines and compares the relative brightness of each depicted face. If the relative brightness of any face is below a threshold level of brightness, control circuitry 202 determines that image 204 cannot be placed in a portion of the graphical layout that will be dimmed and tags image 204 with a negative identifier, indicating that image 204 cannot be dimmed. If the relative brightness of every face meets or exceeds the threshold level of brightness, control circuitry 202 determines that image 204 can be placed in a portion of the graphical layout that will be dimmed and tags image 204 with a positive identifier, indicating that image 204 can be dimmed. Similar to the resolution analysis described above, control circuitry 202 determines whether the overall resolution of image 204 affects any face depicted in image 204. If the overall resolution affects any face, control circuitry 202 determines that image 204 cannot be placed in a portion of the graphical layout that will be blurred and tags image 204 with a negative identifier, indicating that image 204 cannot be blurred. If the overall resolution does not affect any face, control circuitry 202 determines the minimum width of each face and compares the minimum width of each face to a threshold width to determine whether blurring will affect any face. If the minimum width of any face is below the threshold width, control circuitry 202 determines that image 204 cannot be placed in a portion of the graphical layout that will be blurred and tags image 204 with a negative identifier, indicating that image 204 cannot be blurred. If the minimum width of each face meets or exceeds the threshold width, control circuitry 202 determines that image 204 can be placed in a portion of the graphical layout that will be blurred and tags image 204 with a positive identifier, indicating that image 204 can be blurred.

After tagging the image with positive and/or negative identifiers, control circuitry 202 incorporates the tags into image parameters of image 204 and transmits the image parameters 208 back to image database 206 for storage in association with image 204.

Image processor 200 is also configured to select images for placement in a graphical layout in which visual effects are used. Image processor 200 receives input 210 using input circuitry 212. Input 210 is, for example, a request from a media device for images to populate a graphical layout. Input 210 may alternatively be a request for single image to be placed in a particular portion of the graphical layout. Input 210 may include image parameters of the particular portion of the graphical layout in which the image is to be placed. Input 210 may be in the format of an HTTP request, database query, or suitable data access request. Input circuitry 212 may be a modem, ethernet connection, WiFi receiver, USB connection, or any other suitable data connection. Alternatively, if image processor 200 is integrated into the media device, input circuitry 212 may be a data bus interface or other suitable integrated hardware connection, and input 210 may be in the format of a serial data transmission or other suitable hardware transmission format. Input circuitry 212 processes input 210 and transmits a signal 214 corresponding to input 210 to control circuitry 202.

In response to receiving the signal 214 from input circuitry 212, control circuitry 202 transmits a query 216 to image database 206 for images having image parameters that match image parameters included in input 210. Image database 206 returns at least one image 218 to control circuitry 202 that can be placed in the graphical layout. Control circuitry 202 transmits 220 image 218 to output circuitry 222. Output circuitry 222 may be a modem, ethernet connection, WiFi transmitter, USB connection, or any other suitable data connection. Alternatively, if image processor 200 is integrated into the media device, output circuitry 222 may be a data bus interface or other suitable integrated hardware connection, and transmission 220 may be in the format of a serial data transmission or other suitable hardware transmission format. Output circuitry 222 receives transmission 220 and relays 224 transmission 220 containing image 218 to a display device for placement in the graphical layout.

In some embodiments, input 210 identifies a particular portion of a particular layout for which an image is requested, rather than specific image parameters corresponding to the particular portion of the particular layout. Control circuitry 202, upon receiving signal 214 corresponding to input 210, transmits a request 226 to memory 228 for a layout data corresponding to the identified graphical layout. Memory 228 may be any device for storing electronic data such as random-access memory, read-only memory, hard drives, optical drives, digital video disc (DVD) recorders, compact disc (CD) recorders, BLU-RAY disc (BD) recorders, BLU-RAY 3D disc recorders, solid state devices, quantum storage devices, or any other suitable fixed or removable storage devices, and/or any combination of the same. In response to request 226, memory 228 transmits the requested layout data 230 to control circuitry 202. Control circuitry 202 extracts from layout data 230 the image parameters of the identified portion of the particular graphical layout and queries image database 206 for an image matching the image parameters. If the identified portion of the graphical layout will be subject to an image effect, control circuitry selects an image from image database 206 having image parameters that indicate, based on the tags described above, that the image can be placed in a portion of the graphical layout that will be subject to the image effect. If the identified portion will not be subject to an image effect, control circuitry 202 selects an image from image database 206 having matching image parameters to those extracted from the layout data.

Control circuitry 202 may determine from the layout data whether an overlay will be placed over the identified portion of the graphical layout. If so, control circuitry 202 determines the position of the overlay relative to the position of the identified portion of the graphical layout. Control circuitry 202 then retrieves a plurality of images from image database 206 which can be placed in the identified portion of the graphical layout (i.e., images having image parameters that match the image parameters in the layout data for the particular portion of the graphical layout and having tags indicating they can be placed in portions of the layout which will be subject to any visual effects associated with the particular portion) and identifies, for each image, a portion of the image that will be covered by the overlay. Control circuitry 202 then determines for each image whether the overlay will significantly reduce visibility of the portion of the image which will be covered by the overlay, and selects an image for which the overlay will not significantly reduce visibility of the portion of the image.

Figure 3:
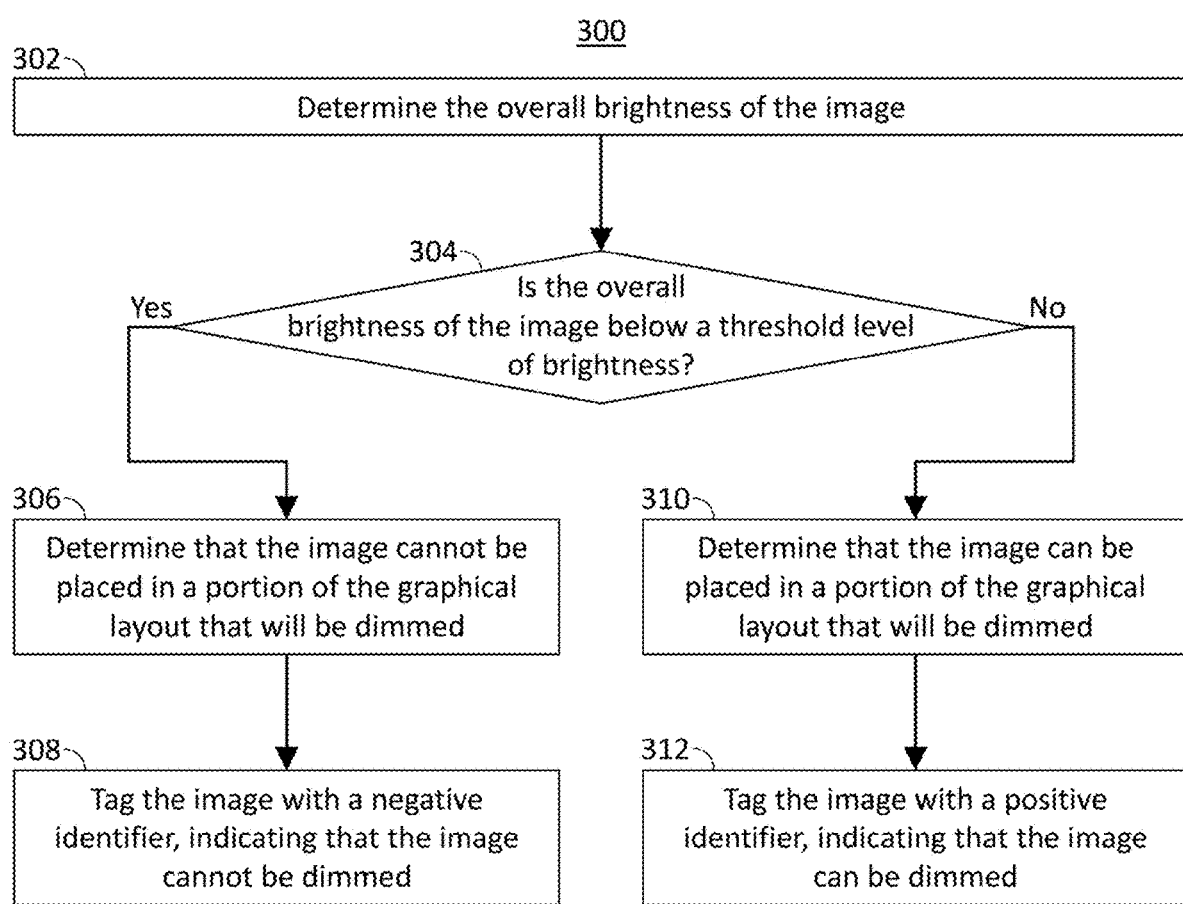
FIG. 3 is a flowchart representing a process for tagging an image, based on the overall brightness of the image, for placement in a portion of the graphical layout which will be dimmed, in accordance with some embodiments of the disclosure.

FIG. 3 is a flowchart representing an illustrative process 300 for tagging an image, based on the overall brightness of the image, for placement in a portion of the graphical interface which will be dimmed, in accordance with some embodiments of the disclosure. Process 300 may be implemented on control circuitry 202. In addition, one or more actions of process 300 may be incorporated into or combined with one or more actions of any other process or embodiment described herein.

At 302, control circuitry 202 determines the overall brightness of the image. For example, control circuitry analyzes color data for each pixel of the image and identifies, based on the color data, a brightness for each pixel. Control circuitry 202 then averages the brightness of each pixel to obtain an average brightness for the entire image.

At 304, control circuitry 202 determines whether the overall brightness of the image is below a threshold level of brightness. If the overall brightness is below the threshold level of brightness, then, at 306, control circuitry 202 determines that the image cannot be placed in a portion of the graphical layout which will be dimmed. At 308, control circuitry 202 tags the image with a negative identifier, indicating that the image cannot be dimmed.

If the overall brightness of the image meets exceeds the threshold level of brightness, then, at 310, control circuitry 202 determines that the image can be placed in a portion of the graphical layout that will be dimmed. At 312, control circuitry 202 tags the image with a positive identifier, indicating that the image can be dimmed.

The actions and descriptions of FIG. 3 may be used with any other embodiment of this disclosure. In addition, the actions and descriptions described in relation to FIG. 3 may be done in suitable alternative orders or in parallel to further the purposes of this disclosure.

Figure 4:
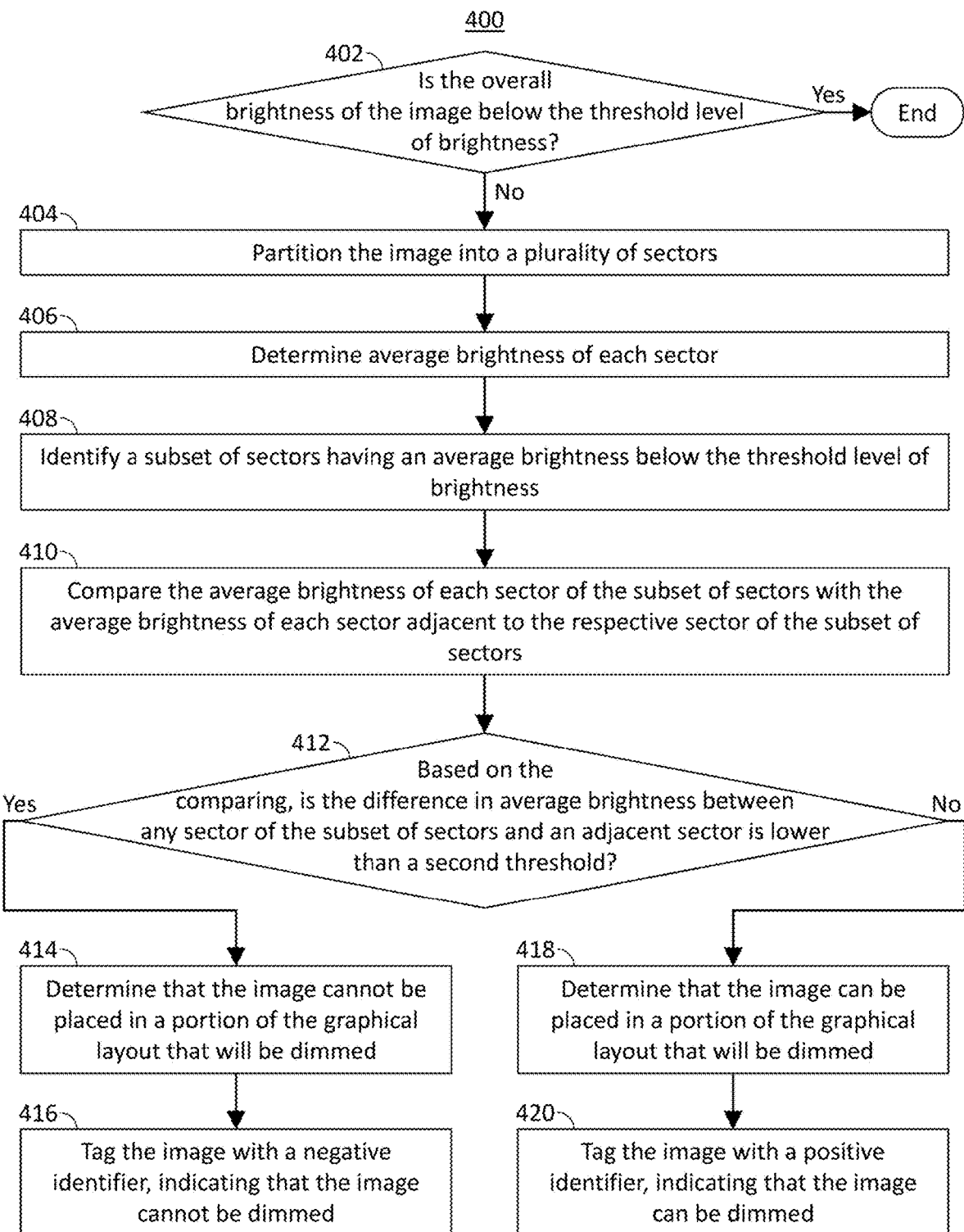
FIG. 4 is a flowchart representing another process for tagging an image, based on the overall brightness of the image, for placement in a portion of the graphical interface which will be dimmed, in accordance with some embodiments of the disclosure.

FIG. 4 is a flowchart representing another illustrative process for tagging an image, based on the overall brightness of the image, for placement in a portion of the graphical interface which will be dimmed, in accordance with some embodiments of the disclosure. Process 400 may be implemented on control circuitry 202. In addition, one or more actions of process 400 may be incorporated into or combined with one or more actions of any other process or embodiment described herein.

While an image may have an overall brightness that exceeds the threshold level of brightness, the image may have several darker areas which may no longer be distinguishable from one another if the image is further dimmed. At 402, control circuitry 202 compares the overall brightness of the image to the threshold level of brightness. If the overall brightness meets or exceeds the threshold level of brightness, then, at 404, control circuitry 202 partitions the image into a plurality of sectors. At 406, control circuitry determines the average brightness of each sector of the image. At 408, control circuitry 202 identifies a subset of sectors having an average brightness below the threshold level of brightness. At 410, control circuitry 202 compares the average brightness of each sector of the subset of sectors with the average brightness of each adjacent sector.

At 412, control circuitry 202 determines, based on the comparison, whether the difference in brightness between any sector and one of its adjacent sectors is lower than a threshold difference in brightness. If so, then, at 414, control circuitry 202 determines that the image cannot be placed in a portion of the graphical layout that will be dimmed and, at 416, control circuitry 202 tags the image with a negative identifier, indicating that the image cannot be dimmed. If the difference in brightness between each sector and all adjacent sectors meets or exceeds the threshold difference in brightness, then, at 418, control circuitry 202 determines that the image can be placed in a portion of the graphical layout that will be dimmed and, at 420, control circuitry 202 tags the image with a positive identifier, indicating that the image can be dimmed.

The actions and descriptions of FIG. 4 may be used with any other embodiment of this disclosure. In addition, the actions and descriptions described in relation to FIG. 4 may be done in suitable alternative orders or in parallel to further the purposes of this disclosure.

Figure 5:
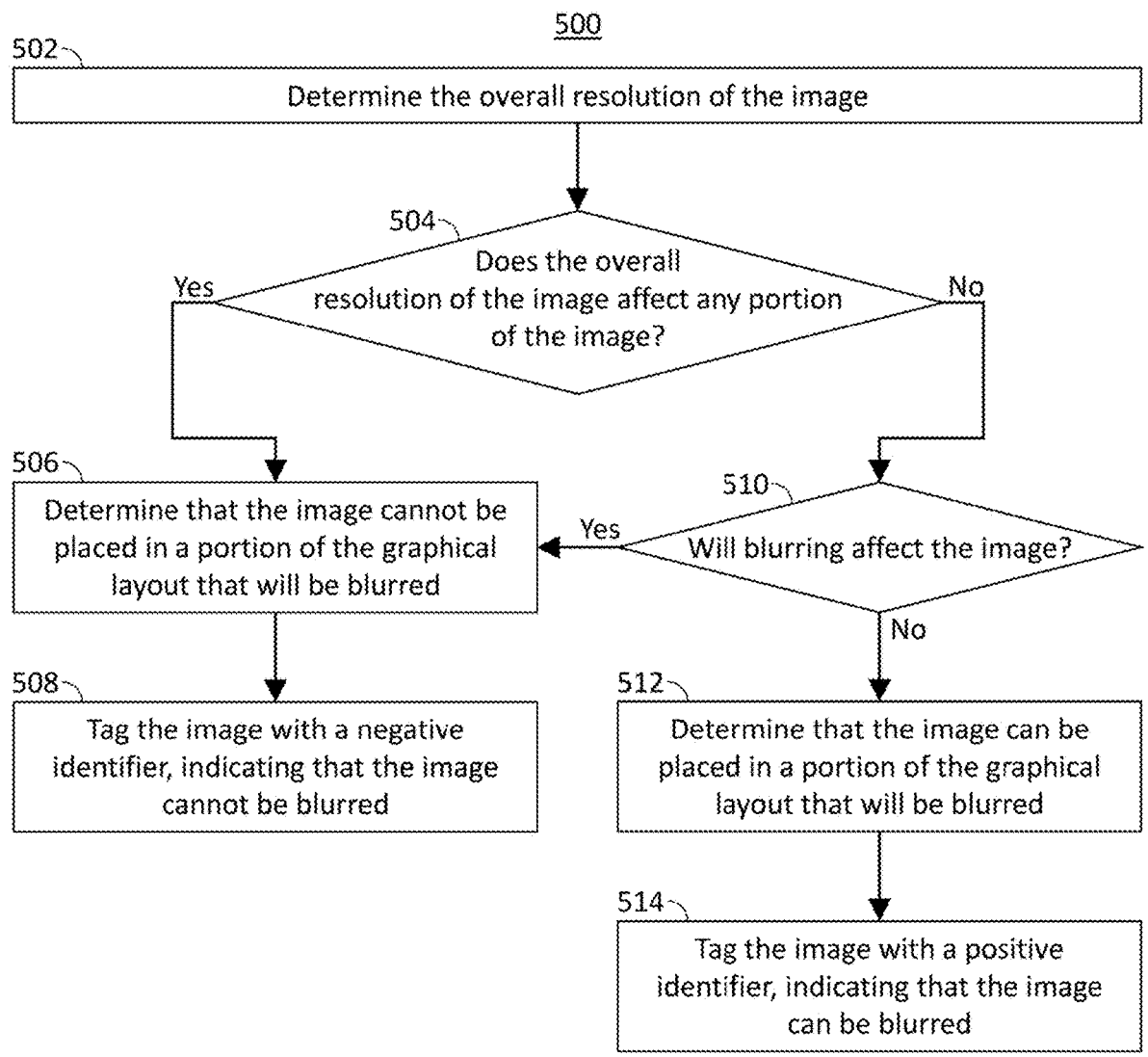
FIG. 5 is a flowchart representing a process for tagging an image, based on the overall resolution of the image, for placement in a portion of the graphical interface which will be blurred, in accordance with some embodiments of the disclosure.

FIG. 5 is a flowchart representing an illustrative process 500 for tagging an image, based on the overall resolution of the image, for placement in a portion of the graphical interface which will be blurred, in accordance with some embodiments of the disclosure. Process 500 may be implemented on control circuitry 202. In addition, one or more actions of process 500 may be incorporated into or combined with one or more actions of any other process or embodiment described herein.

At 502, control circuitry 202 determines the overall resolution of the image. Control circuitry 202 may access metadata of the image which indicates the resolution of the image. Alternatively, control circuitry 202 may determine the dimensions of the image in pixels. At 504, control circuitry 202 determines whether the overall resolution of the image affects any portion of the image. For example, control circuitry 202 identifies a plurality of objects depicted in the image using edge detection. Control circuitry 202 then determines, for each object, whether the edge of the object is blurred based on color and brightness data corresponding to each pixel of the image that is adjacent to the detected edge of the object. If the overall resolution of the image affects any portion of the image, then, at 506, control circuitry 202 determines that the image cannot be placed in a portion of the graphical layout that will be blurred and, at 508, control circuitry 202 tags the image with a negative identifier, indicating that the image cannot be blurred.

If the overall resolution does not affect any portion of the image, then, at 510, control circuitry 202 determines whether blurring will affect any portion of the image. If so, then processing returns to step 506. If not, then, at 512, control circuitry 202 determines that the image can be placed in a portion of the graphical interface that will be blurred and, at 514, control circuitry 202 tags the image with a positive identifier, indicating that the image can be blurred.

The actions and descriptions of the FIG. 5 may be used with any other embodiment of this disclosure. In addition, the actions and descriptions described in relation to FIG. 5 may be done in suitable alternative orders or in parallel to further the purposes of this disclosure.

Figure 6:
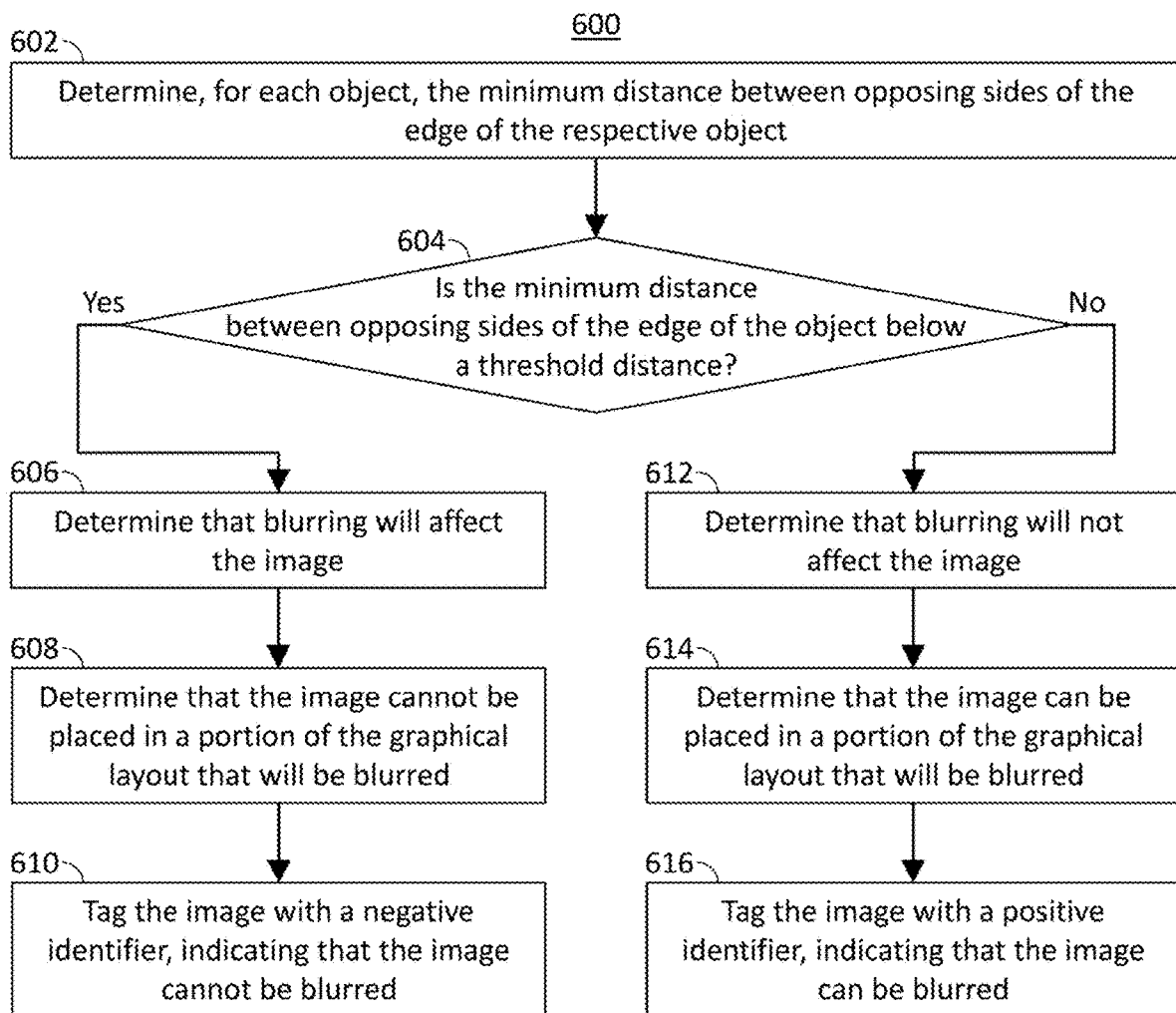
FIG. 6 is a flowchart representing another process for tagging an image, based on the overall resolution of the image, for placement in a portion of the graphical interface which will be blurred, in accordance with some embodiments of the disclosure.

FIG. 6 is a flowchart representing another illustrative process 600 for tagging an image, based on the overall resolution of the image, for placement in a portion of the graphical interface which will be blurred, in accordance with some embodiments of the disclosure. Process 600 may be implemented on control circuitry 202. In addition, one or more actions of process 600 may be incorporated into or combined with one or more actions of any other process or embodiment described herein.

At 602, control circuitry 202 determines, for each object depicted in the image, the minimum distance between opposing sides of the edge of the object. For example, an object having an irregular shape may have sections that are wide and sections that are narrow. While the overall resolution of the image preserves the narrowest portion of the object, further blurring may obscure or remove the narrowest portion of the object from view. At 604, control circuitry 202 determines whether the minimum distance between opposing sides of the edge of the object is below a threshold distance. If so, then, at 606, control circuitry 202 determines that blurring will affect the image. In response, at 608, control circuitry 202 determines that the image cannot be placed in a portion of the graphical interface that will be blurred and, at 610, tags the image with a negative identifier, indicating that the image cannot be blurred.

If the minimum distance between opposing sides of the edge of the object meets or exceeds the threshold distance, then, at 612, control circuitry 202 determines that blurring will not affect the image. In response, at 614, control circuitry 202 determines that the image can be placed in a portion of the image that will be blurred and, at 614, control circuitry 202 tags the image with a positive identifier, indicating that the image can be blurred.

The actions and descriptions of FIG. 6 may be used with any other embodiment of this disclosure. In addition, the actions and descriptions described in relation to FIG. 6 may be done in suitable alternative orders or in parallel to further the purposes of this disclosure.

Figure 7:
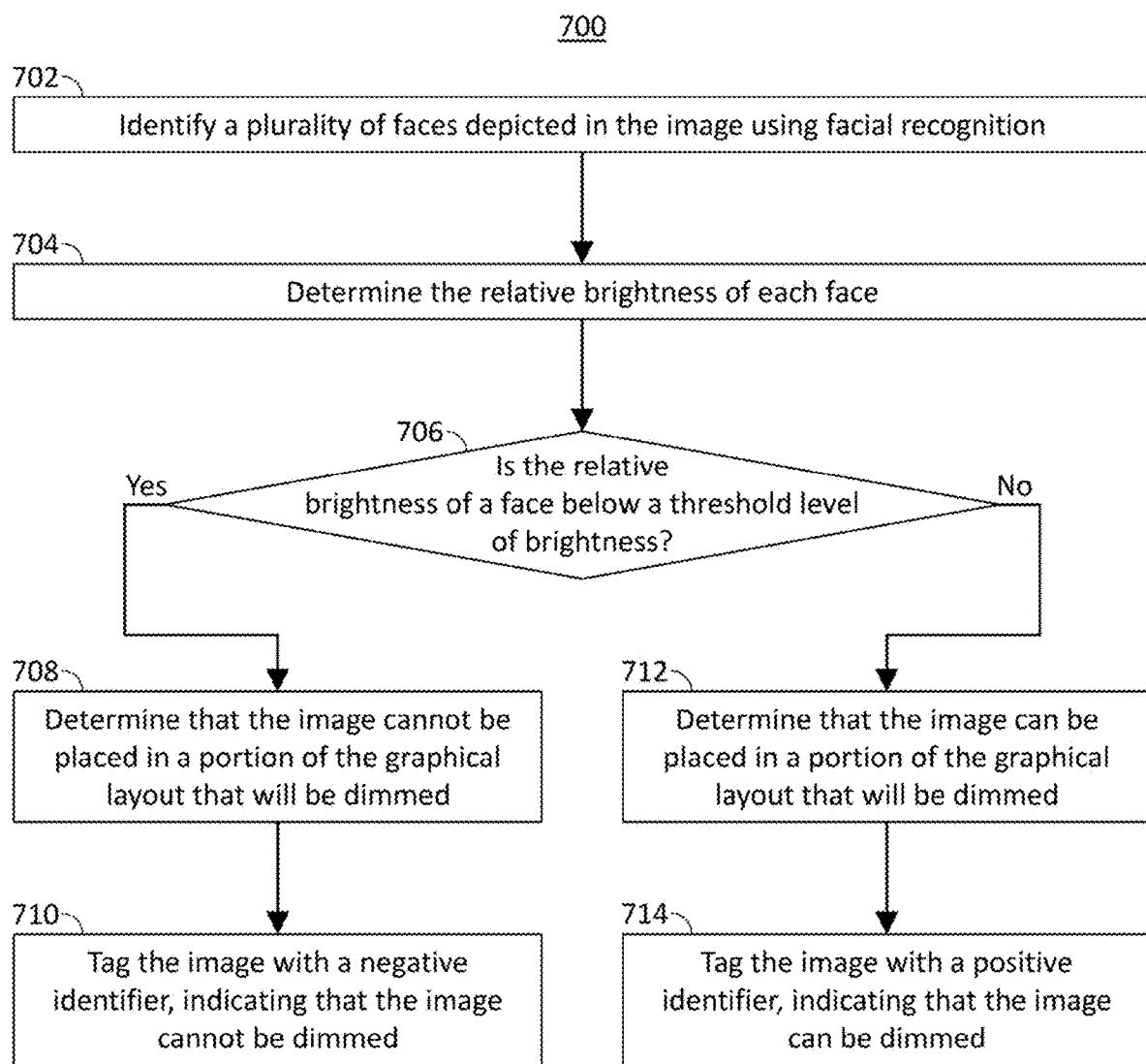
FIG. 7 is a flowchart representing a process for tagging an image, based on the relative brightness of faces depicted in the image, for placement in a portion of the graphical layout which will be dimmed, in accordance with some embodiments of the disclosure.

FIG. 7 is a flowchart representing an illustrative process 700 for tagging an image, based on the relative brightness of faces depicted in the image, for placement in a portion of the graphical layout which will be dimmed in accordance with some embodiments of the disclosure. Process 700 may be implemented on control circuitry 202. In addition, one or more actions of process 700 may be incorporated into or combined with one or more actions of any other process or embodiment described herein.

At 702, control circuitry 202 identifies a plurality of faces depicted in the image using facial recognition. At 704, control circuitry 202 determines the relative brightness of each face. For example, control circuitry 202 analyses color and brightness information of the pixels that comprise each face to determine an average brightness for each face. Control circuitry 202 then determines the face with the lowest brightness and the face with the highest brightness and scales all detected faces between the lowest and highest brightnesses.

At 706, control circuitry 202 determines whether the relative brightness of a face is below a threshold level of brightness. If so, then, at 708, control circuitry 708 determines that the image cannot be placed in a portion of the graphical layout that will be dimmed and, at 710, control circuitry 202 tags the image with a negative identifier, indicating that the image cannot be dimmed. If the relative brightness of each face meets or exceeds the threshold level of brightness, then, at 712, control circuitry 202 determines that the image can be placed in a portion of the graphical layout that will be dimmed and, at 714, control circuitry 202 tags the image with a positive identifier, indicating that the image can be dimmed.

The actions and descriptions of FIG. 7 may be used with any other embodiment of this disclosure. In addition, the actions and descriptions described in relation to FIG. 7 may be done in suitable alternative orders or in parallel to further the purposes of this disclosure.

Figure 8:
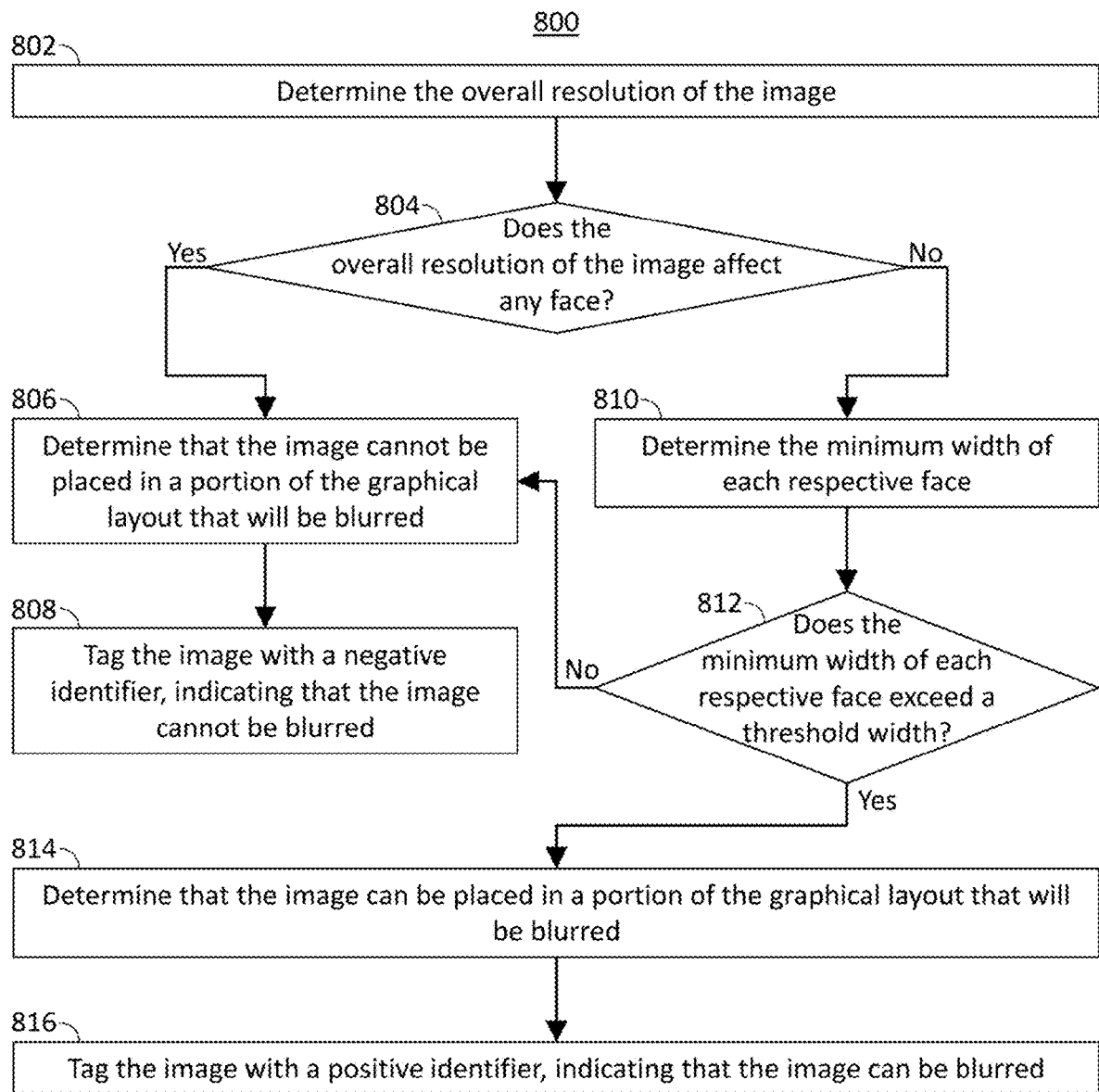
FIG. 8 is a flowchart representing a process for tagging an image, based on the size of faces depicted in the image, for placement in a portion of the graphical interface which will be blurred, in accordance with some embodiments of the disclosure.

FIG. 8 is a flowchart representing an illustrative process 800 for tagging an image, based on the size of faces depicted in the image, for placement in a portion of the graphical interface which will be blurred in accordance with some embodiments of the disclosure. Process 800 may be implemented on control circuitry 202. In addition, one or more actions of process 800 may be incorporated into or combined with one or more actions of any other process or embodiment described herein.

At 802, control circuitry 202 determines the overall resolution of the image. This may be accomplished using methods described above in connection with FIG. 5. At 804, control circuitry 202 determines whether the overall resolution of the image affects any face. This may also be accomplished used methods described above in connection with FIG. 5. If the overall resolution of the image affects any face, then, at 806, control circuitry 202 determines that the image cannot be placed in a portion of the graphical layout that will be blurred and, at 808, control circuitry 202 tags the image with a negative identifier, indicating that the image cannot be blurred.

If the overall resolution does not affect any face, then, at 810, control circuitry 202 determines the minimum width of each face and, at 812, control circuitry 202 determines whether the minimum width of each face exceeds a threshold width. If the minimum width of any face does not exceed the threshold width, then processing returns to step 806. If the minimum width of every face exceeds the threshold width, then, at 814, control circuitry 202 determines that the image can be placed in a portion of the graphical layout that will be blurred and, at 816, control circuitry 202 tags the image with a positive identifier, indicating that the image can be blurred.

The actions and descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
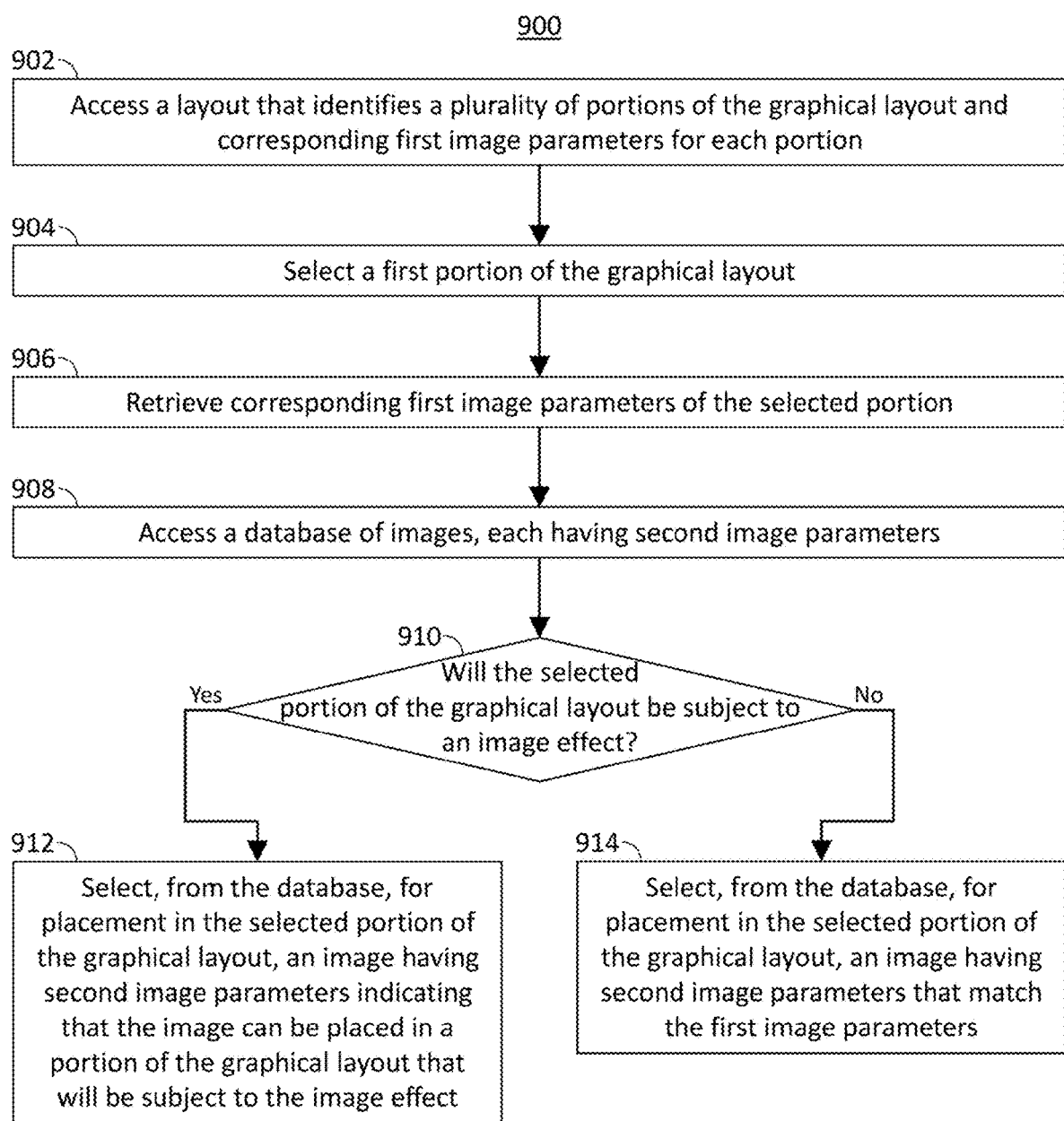
FIG. 9 is a flowchart representing a process for selecting an image from a database for placement in a portion of the graphical interface, in accordance with some embodiments of the disclosure.

FIG. 9 is a flowchart representing a process 900 for selecting an image from a database for placement in a portion of the graphical interface in accordance with some embodiments of the disclosure. Process 900 may be implemented on control circuitry 202. In addition, one or more actions of process 900 may be incorporated into or combined with one or more actions of any other process or embodiment described herein.

At 902, control circuitry 202 accesses, from memory 228, a layout that identifies a plurality of portions of the graphical layout and corresponding image parameters for each portion of the graphical layout. At 904, control circuitry 202 selects a portion of the graphical layout. The selected portion may correspond to a particular portion indicated in, for example, input 210. At 906, control circuitry 202 retrieves corresponding image parameters of the selected portion from the layout. At 908, control circuitry 202 access a database of images (e.g., image database 206), each image having corresponding image parameters. At 910, control circuitry 202 determines whether the selected portion of the graphical layout will be subject to an image effect. For example, control circuitry 202 may extract, from the layout, image effect indicators from the image parameters corresponding to the selected portion of the graphical layout.

If the selected portion of the graphical layout will be subject to an image effect, then, at 912, control circuitry 202 selects, from the database, for placement in the selected portion, an image having image parameters (e.g., a tag applied according to the methods described above) indicating that the image can be placed in a portion of the graphical layout that will be subject to the image effect. If the selected portion of the graphical layout will not be subject to an image effect, then, at 914, control circuitry 202 selects, from the database, for placement in the selected portion, an image having image parameters that match the image parameters corresponding to the selected portion of the graphical layout.

The actions and descriptions of FIG. 9 may be used with any other embodiment of this disclosure. In addition, the actions and descriptions described in relation to FIG. 9 may be done in suitable alternative orders or in parallel to further the purposes of this disclosure.

Figure 10:
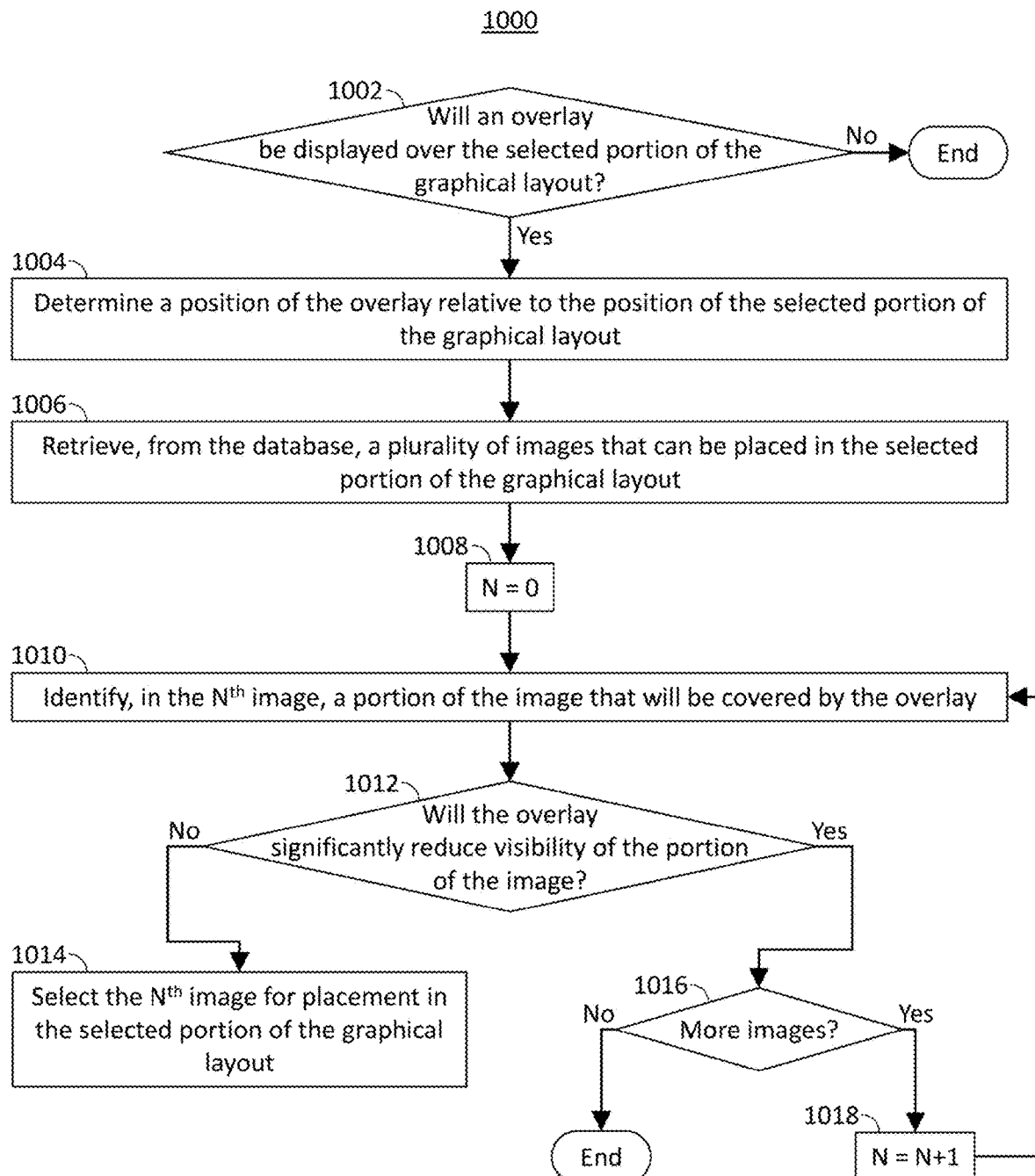
FIG. 10 is a flowchart representing another process for selecting an image from a database for placement in a portion of the graphical interface, in accordance with some embodiments of the disclosure.

FIG. 10 is a flowchart representing another illustrative process 1000 for selecting an image from a database for placement in a portion of the graphical interface in accordance with some embodiments of the disclosure. Process 1000 may be implemented on control circuitry 202. In addition, one or more actions of process 1000 may be incorporated into or combined with one or more actions of any other process or embodiment described herein.

At 1002, control circuitry 202 determines whether an overlay will be displayed over the selected portion of the graphical layout. For example, control circuitry 202 may extract from the layout position and dimension parameters for each portion of the graphical layout and determine, based on the position and dimension parameters, whether any portion will overlap with another portion. At 1004, control circuitry 202 determines a position of the overlay relative to the position of the selected portion. At 1006, control circuitry 202 retrieves from a database of images (e.g., image database 206) a plurality of images that can be placed in the selected portion of the graphical layout.

At 1008, control circuitry 202 initializes a counter variable N and sets its value to 0. At 1010, control circuitry 202 identifies, in the $N^{th}$ image, a portion of the image that will be covered by the overlay. For example, using the position and dimension parameters, control circuitry 202 determines a specific area or sector of the image that will be covered by the overlay. At 1012, control circuitry 202 determines whether the overlay will significantly reduce visibility of the portion of the image. For example, control circuitry 202 determines, based on the dimension parameters of the overlay, how much of the image will be covered by the overlay. Control circuitry 202 then identifies objects depicted in the portion of the image and whether such objects occupy a larger portion of the image than the portion that will be covered by the overlay. If the overlay will completely cover a small object, then control circuitry 202 may determine that the overlay will significantly reduce visibility of the portion of the image. If, however, the overlay will partially cover a larger object, control circuitry 202 may determine that the overlay will not significantly reduce visibility of the portion of the image.

If the overlay will not significantly reduce the visibility of the portion of the $N^{th}$ image, then, at 1014, control circuitry 202 selects the $N^{th}$ image for placement in the selected portion of the graphical layout. If, however, the overlay will significantly reduce visibility of the portion of the $N^{th}$ image, then, at 1016, control circuitry 202 determines whether there are additional images to analyze and, if so, at 1018, control circuitry 202 increments the value of counter variable N by one and processing returns to step 1010.

The actions and descriptions of FIG. 10 may be used with any other embodiment of this disclosure. In addition, the actions and descriptions described in relation to FIG. 10 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for selecting an image for placement in a graphical layout, the method comprising:
    determining whether an overlay will be displayed over a portion of the graphical layout; and
    in response to determining that an overlay will be displayed over the portion of the graphical layout:
        determining a position of the overlay relative to the position of the portion of the graphical layout;
        retrieving, from a database, a plurality of images that can be placed in the portion of the graphical layout located at the position;
        identifying, in each image, a portion of the respective image that will be covered by the overlay;
        determining whether the overlay will significantly reduce visibility of the portion of the respective image; and
        in response to determining that the overlay will not significantly reduce visibility of the portion of the respective image, selecting the respective image for placement in the portion of the graphical layout.

2. The method of claim 1, further comprising:
    accessing the graphical layout, wherein the graphical layout identifies a plurality of portions of the graphical layout and corresponding first image parameters for each respective portion of the graphical layout; and
    retrieving image parameters corresponding to the portion of the graphical layout that will be covered by the overlay;
    wherein retrieving a plurality of images that can be placed in the portion of the graphical layout comprises retrieving a plurality of images each having respective image parameters matching the retrieved image parameters corresponding to the portion of the graphical layout that will be covered by the overlay.

3. The method of claim 1, wherein determining whether the overlay will significantly reduce visibility of the portion of the respective image further comprises:
    determining image attributes of the portion of the respective image;
    determining at least one image attribute that will be affected by the overlay and an amount by which the at least one image attribute will be affected;
    calculating potential affected image attributes of the portion of the respective image; and
    determining whether at least one potential affected image attribute is below a corresponding visibility threshold.

4. A system for selecting an image for placement in a graphical layout, the system comprising:

memory; and control circuitry configured to:
    determine whether an overlay will be displayed over a portion of the graphical layout; and
    in response to determining that an overlay will be displayed over the portion of the graphical layout:
        determine a position of the overlay relative to the position of the portion of the graphical layout;
        retrieve, from a database stored in the memory, a plurality of images that can be placed in the portion of the graphical layout located at the position;
        identify, in each image, a portion of the respective image that will be covered by the overlay;
        determine whether the overlay will significantly reduce visibility of the portion of the respective image; and
        in response to determining that the overlay will not significantly reduce visibility of the portion of the respective image, select the respective image for placement in the portion of the graphical layout.

5. The system of claim 4, wherein the control circuitry is further configured to:
    access the graphical layout, wherein the graphical layout identifies a plurality of portions of the graphical layout and corresponding first image parameters for each respective portion of the graphical layout; and
    retrieve image parameters corresponding to the portion of the graphical layout that will be covered by the overlay;
    wherein the control circuitry configured to retrieve a plurality of images that can be placed in the portion of the graphical layout is further configured to retrieve a plurality of images each having respective image parameters matching the retrieved image parameters corresponding to the portion of the graphical layout that will be covered by the overlay.

6. The system of claim 4, wherein the control circuitry configured to determine whether the overlay will significantly reduce visibility of the portion of the respective image is further configured to:
    determine image attributes of the portion of the respective image;
    determine at least one image attribute that will be affected by the overlay and an amount by which the at least one image attribute will be affected;
    calculate potential affected image attributes of the portion of the respective image; and
    determine whether at least one potential affected image attribute is below a corresponding visibility threshold.

7. A non-transitory computer-readable medium having non-transitory computer-readable instructions encoded thereon for selecting an image for placement in a graphical layout which, when executed by control circuitry, cause the control circuitry to:
    determine whether an overlay will be displayed over a portion of the graphical layout; and
    in response to determining that an overlay will be displayed over the portion of the graphical layout:
        determine a position of the overlay relative to the position of the portion of the graphical layout;
        retrieve, from a database stored in the memory, a plurality of images that can be placed in the portion of the graphical layout located at the position;
        identify, in each image, a portion of the respective image that will be covered by the overlay;
        determine whether the overlay will significantly reduce visibility of the portion of the respective image; and
        in response to determining that the overlay will not significantly reduce visibility of the portion of the respective image, select the respective image for placement in the portion of the graphical layout.

8. The non-transitory computer-readable medium of claim 7, wherein execution of the instructions further causes the control circuitry to:
    access the graphical layout, wherein the graphical layout identifies a plurality of portions of the graphical layout and corresponding first image parameters for each respective portion of the graphical layout; and
    retrieve image parameters corresponding to the portion of the graphical layout that will be covered by the overlay;
    wherein the control circuitry configured to retrieve a plurality of images that can be placed in the portion of the graphical layout is further configured to retrieve a plurality of images each having respective image parameters matching the retrieved image parameters corresponding to the portion of the graphical layout that will be covered by the overlay.

9. The non-transitory computer-readable medium of claim 7, where execution of the instruction to determine whether the overlay will significantly reduce visibility of the portion of the respective image further causes the control circuitry to:
    determine image attributes of the portion of the respective image;
    determine at least one image attribute that will be affected by the overlay and an amount by which the at least one image attribute will be affected;
    calculate potential affected image attributes of the portion of the respective image; and
    determine whether at least one potential affected image attribute is below a corresponding visibility threshold.

* * * * *